United States Patent [19]

Tufty-Wisniewski et al.

[11] Patent Number: 5,492,729

[45] Date of Patent: Feb. 20, 1996

[54] METHOD FOR MAKING A TERRA SIGILLATA COATED PAN

[75] Inventors: Karen Tufty-Wisniewski; William B. Crandall, both of Alfred, N.Y.

[73] Assignee: Tufty Ceramics, Inc., Andover, N.Y.

[21] Appl. No.: 365,795

[22] Filed: Dec. 29, 1994

[51] Int. Cl.[6] ........................................... B05D 3/02
[52] U.S. Cl. ................................................. 427/376.2
[58] Field of Search .................................... 427/376.2

[56] References Cited

U.S. PATENT DOCUMENTS 4,155,788   5/1979   Crandall et al. ..................... 156/89
4,162,334   7/1979   Crandall et al. ..................... 426/505
4,168,334   9/1979   Crandall et al. ..................... 428/35
4,229,494   10/1980   Crandall et al. ..................... 428/35

*Primary Examiner*—Benjamin Utech
*Attorney, Agent, or Firm*—Howard J. Greenwald

[57] ABSTRACT

A process for preparing a terra sigillata coated body in which a clay green body containing clay, from about 3 to about 15 weight percent of water, and from about 0.05 to about 0.4 weight percent of barium carbonate is coated with a coating composition, and the coated composition is thereafter fired.

13 Claims, 2 Drawing Sheets

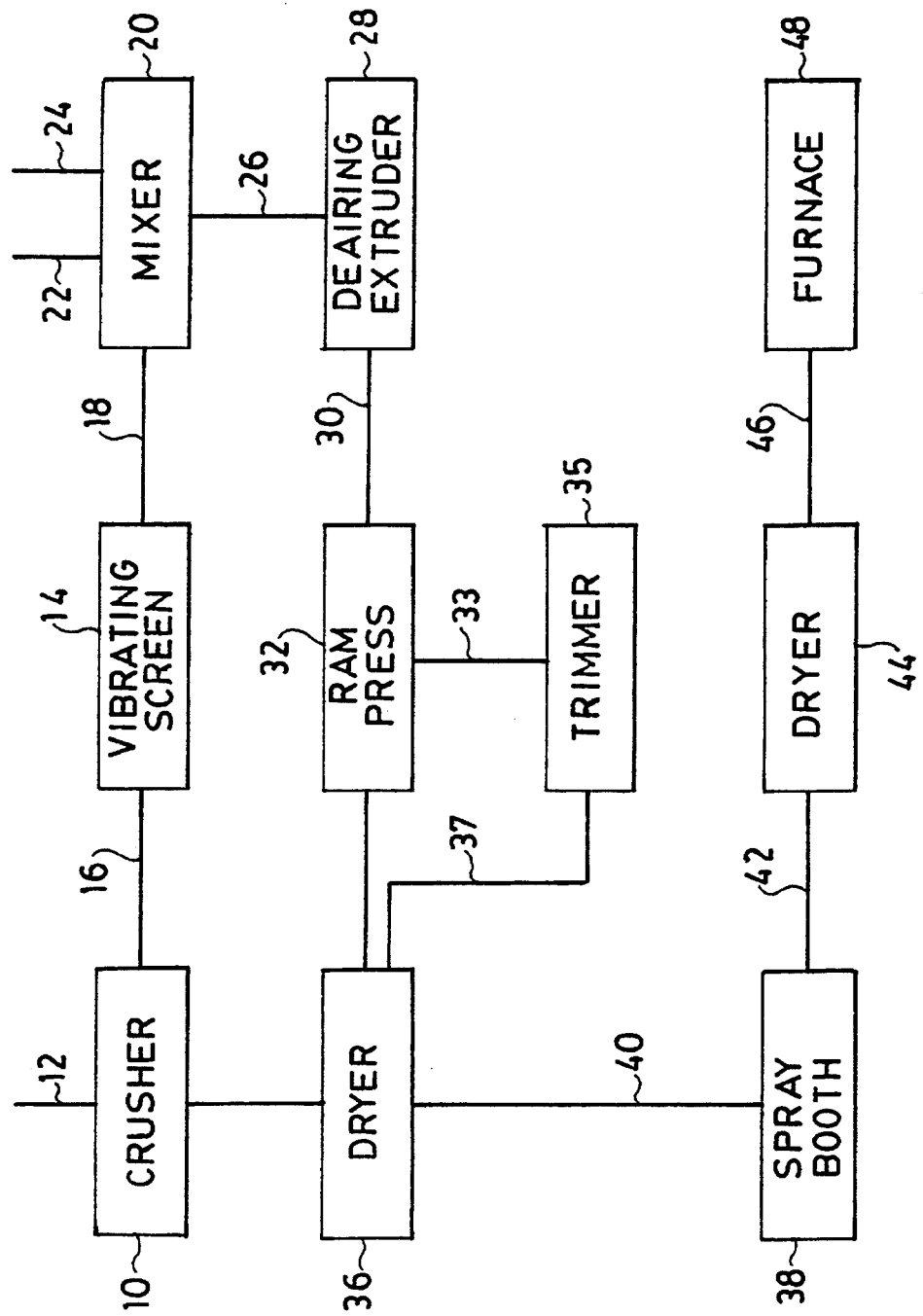

5,492,729

METHOD FOR MAKING A TERRA SIGILLATA COATED PAN

FIELD OF THE INVENTION

A process for making ceramic cookware such as earthenware or brickware pans used for baking baked goods.

BACKGROUND OF THE INVENTION

Bread baked in brick ovens has certain appetizing characteristics and physical qualities. The home baker generally bakes bread in glass or metal pans. To achieve qualities similar to those of brick oven baked bread, home economists often advise lining an ordinary household oven with clay tiles or ordinary bricks and to bake the dough directly on the tile or brick surface without the use of a glass or metal pan. Such practice has many inconveniences, such as those of handling and storing the bricks as well as wasting much heat energy to heat the bricks in order to bake the dough.

Earthenware baking or cooking vessels made of unglazed or of glazed ceramics are known and have been used in baking breads. However, the surface of unglazed, or bisque, ceramicware is often quite porous and bread baked in such ware tends to stick to the walls of the vessel making it difficult to remove. In the case of glazed ceramicware, the glazed surface does not provide the baked bread product with the taste qualities of brick oven surfaced baked bread.

U.S. Pat. No. 4,168,334 of William B. Crandall et al. discloses a method for baking bread which has the taste and physical characteristics of brick oven baked bread. In the method of this patent, comprising bread dough is baked in a bread pan comprising a porous fired brickware body having a water permeability of at least about 2 percent and having at least its baking surfaces coated with a fired terra sigillata coating which closes only a portion of the pores of said surfaces of said body.

The process of the Crandall patent, although it often produces a fired body with a relatively smooth surface, does not repeatedly produce a bakeware with a very smooth surface. Bakeware with very smooth surfaces are easier to clean and, furthermore, are easier to use.

Furthermore, the process of the Crandall patent often produces fired bakeware which, over time, becomes discolored due to the migration of soluble salts in the bakeware to its surface.

It is an object of this invention to provide a process for preparing ceramic cookware in which a relatively smooth and durable layer of terra sigillata is deposited on the surface of the cookware.

It is another object of this invention to provide a process for preparing ceramic cookware in which the cookware so provided exhibits substantially less scumming than the prior art cookware.

It is yet another object of this invention to provide a process for preparing ceramic cookware in which the incidence of crack propagation during processing is minimized.

SUMMARY OF THE INVENTION

In accordance with this invention, there is provided a process for preparing a ceramic cookware in which a ceramic green body is first formed. Thereafter, while the ceramic green body has a moisture content of from about 3 to about 12 weight percent, the body is then coated with terra sigilata. The coated body is then dried and fired to produce the desired ceramic cookware.

BRIEF DESCRIPTION OF THE DRAWING

The present invention will be more fully understood by reference to the following detailed description thereof, when read in conjunction with the attached drawing, wherein like reference numerals refer to like elements and wherein:

FIG. 3 is a flow diagram illustrating one preferred process of the instant invention.

DESCRIPTION OF THE PREFERRED EMBODIMENTS

The process of this invention is an improvement upon the process described in U.S. Pat. Nos. 4,162,334 and 4,168,334; the entire disclosure of these patents is hereby incorporated by reference into this specification.

Figure 1:
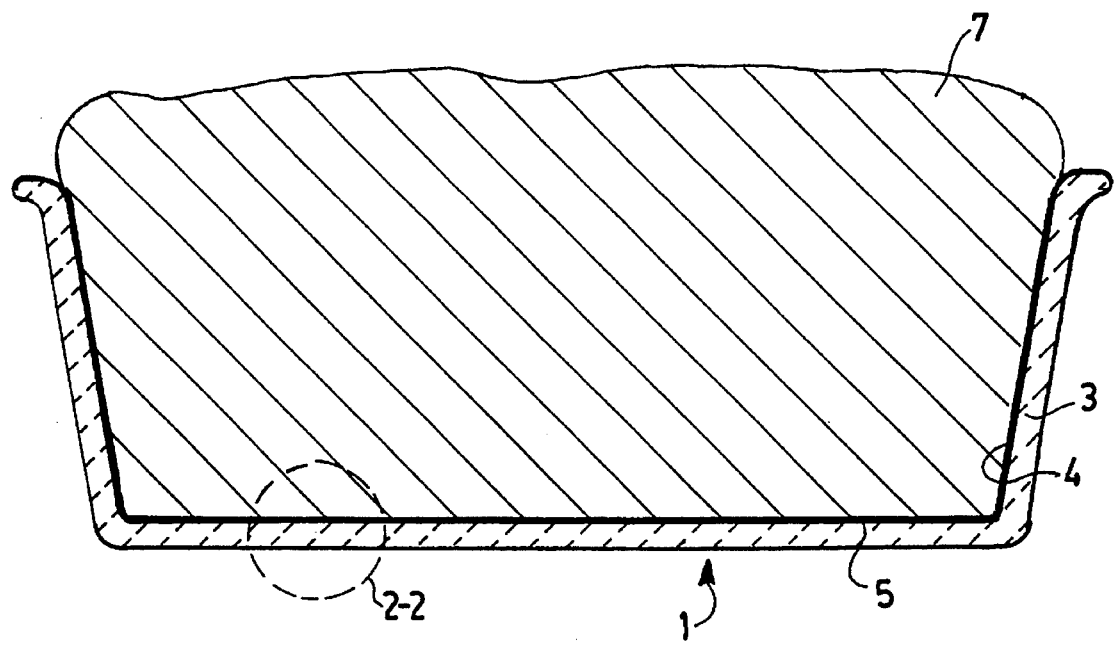
FIG. 1 is a cross-sectional view of a preferred bread pan of this invention.
Figure 2:
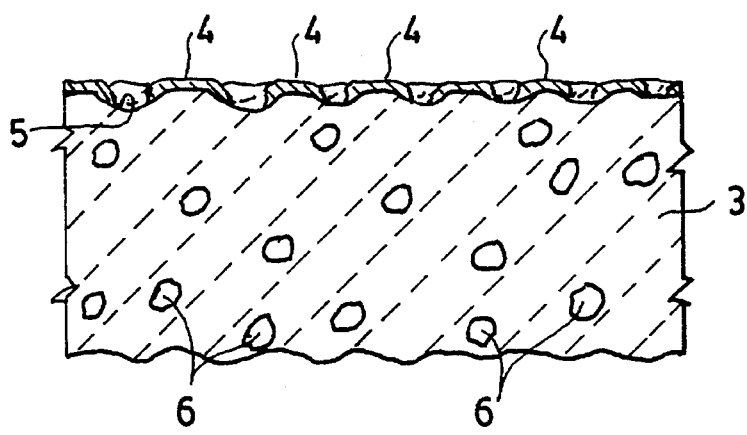
FIG. 2 is an enlarged cross-sectional view of the encircled part of the terra sigillata coated surface of the bread pan of FIG. 2.

FIGS. 1 and 2 illustrate one preferred bread pan which can be made in accordance with the process of this invention.

The green molded vessels or pans of this invention are fired in a known way at firing temperatures ranging from about pyrometric cone 08 (950° C.) to about cone 2 (1160° C.) (rapidly heated at 150° C./hr.). Firing temperatures of about cone 06 (1015° C.) to about cone 02 (1125° C.) are preferably used. At the lower firing temperature of 950° C., a shrinkage of about 2% of the body dimensions occurs; at the other extreme, at a firing temperature of 1160° C., a shrinkage of about 7% occurs. In the preferred firing temperature range, the shrinkage is about 4 to 6%. Water absorption or permeability to gases or water of the fired bodies vary inversely to the firing temperature and range from about 12% water permeability, based on the dry weight of the body, at 950° C. to about 2% at 1160° C. Bodies fired at 1000° C. to 1120° C. (the preferred firing temperature range), have a water permeability of from about 8 to 10%. The degree of permeability can be advantageously controlled by use of the terra sigillata coating of this invention as further described herein.

The fired brickware body 3 can be used to bake bread having the taste and physical qualities of oven baked bread. However, the porous surfaces 5 of the brickware body 3 should cause the baked bread to stick somewhat to the surfaces 5. It has been found that the tendency of the bread to stick can be overcome by applying to the brickware body 3 a terra sigillata coating 4 as described below.

FIG. 1 illustrates a cross-section of a brickware bread pan 1 containing a loaf 7 of baked bread. The bread pan 1 comprises a body 3 and a terra sigillata coating 4 on at least the baking surfaces 5 of the body 3.

FIG. 2 shows a section 2 of the brickware body 3 greatly enlarged and shows a layer of flat particles forming the terra sigillata coating 4 on the surface 5 of the brickware body 3. The terra sigillata coating 4 covers a portion of the open pores 6 on the surface, such as 30–95% thereof and preferably 50% of the pores 6. Usually the terra sigillata closes only about 30% to 60% of the pores of the body. While the inventors do not intend to be bound by any theory, they believe that the terra sigillata coating 4 provides non-stick characteristics partly because of the flat nature of the particles and partly because a portion of the open pores (but not all) are closed. Preferably, the surface is still at least about 10% porous. This feature permits the brickware body 3 to impart the taste and physical qualities of brick oven baked bread in the bread pan 1 while rendering the surfaces 5 free from sticking propensities toward the bread.

Referring again to FIG. 2, layers of particles of a desired thickness are readily obtained by spraying a coating composition of terra sigillata onto the body surfaces 5 of the brickware body 3 at a coverage from 0.3 to 0.9 mg/cm$^2$ dry basis, and preferably at a coverage of about 0.6 mg/cm$^2$.

The clay-like particles best suited for the terra sigillata coating of this invention usually include a high percentage of illite particles, although other clay-like particles like kalonite will also be useful.

The particle size of the separated minerals is usually less than three microns. A few larger particles, if present, will tend to reduce the effect of the finer particles as they lay flat on the surface of the clay body. The dispersed suspension of the particles has a low specific gravity.

A fluid spray of this low specific gravity mass (1.13 gm/cc) allows the clay-like particles to flow easily as they strike the surface of the clay body and permit them to lay down on their flat "plate-like" surfaces.

When the cookware item is fired (heated) to the temperature described, the clay-like particles go through structural changes (macroscopically and microscopically) which destroy the original mineral form. However, there seems to be a "memory" for original clay-like particles, the amount of this memory depending upon the firing (heating), procedure (rate) and final temperature. A better understanding of this transformation process can be obtained by studying the D.T.A. (Differential Thermal Analysis) of this firing process. (Example in "Ceramic Science for the Potter" by W. G. Lawrence, page 57, published by Chilton Book Company, 1972).

When the cookware item is prepared from the Alfred Shale body and Alfred Shale Terra Sigillata, as described herein and heated to the temperatures described, the resulting product has a satin-like surface over a porous body. The physical and mechanical properties thus derived impart strength and durability in the body and a proper amount of exposed pores, so that cooking oils and water may penetrate the cookware in a controlled fashion, while eliminating possible sticking of the food inside through the property of the terra sigillata surface.

The terra sigillata surfaces described herein impart beneficial properties of the food as described later.

A Preferred Process of the Invention

A preferred process of producing applicants' cookware will be described by reference to FIG. 3, which is a flow diagram.

The body 3 of the ceramic cookware of this invention may be made from any of the well-known fire clays and common brick clays used to make earthenware cookware.

As is known to those skilled in the art, fire clay is a clay that is high in alumina or silica whose diffusion is not less than cone 19 (1,515 degrees C.); see, e.g., page 429 of "A Dictionary of Mining, Mineral, and Related Terms," compiled by Paul W. Thrush and the Staff of the Bureau of Mines (United States Department of the Interior, Bureau of Mines, 1968).

Brick clay is a clay possessing properties suitable for the preparation of brick which usually fires to a red color, is somewhat impure, and contains considerable amounts of fluxing ingredients.

As will be apparent to those skilled in the art, substantially any clay body can be coated with terra sigillata. Thus, by way of illustration and not limitation, one may coat the clay bodies described in U.S. Pat. Nos. 151,246 of Schreiber, 1,663,660 of Hottinger, 1,814,870 of Tycer, 3,202,542 of Poje, 3,523,817 of Reiss, 3,539,387 of Kelly et al., 3,780,642 of Bay, 3,854,023 of Levinson, and the like. The disclosure of each of these United States patents is hereby incorporated by reference into this specification.

Referring to FIG. 3, and in the preferred process illustrated therein, one or more of the aforementioned clays is charged to a crusher 10 via line 12. The chemical composition of the aforementioned clays, as well as their compositions in terms of clay/shale minerals, are well known. Typically, such clays consist of hydrous aluminum silicates, containing more or less foreign matter such as ferrous oxide ($Fe_2O_3$) which contributes the reddish color frequently associated with clay, silica ($SiO_2$) as sand, and calcium carbonate ($CaCO_3$) as limestone. Shales are fine-grained compacted rocks whose original constituents were clays or muds. The chemical composition of shales used to practice this invention therefore is similar to that of the fire and brick clays described above.

In one preferred embodiment, the ceramic raw material used to make the body of the ceramic cookware is a shale. As is known by those skilled in the art, shale is a thinly stratified or laminated, sedimentary, and consolidated rock with well-marked cleavage parallel to the bedding,, composed of clay, quartz, mica, and other minerals. See, e.g., A.S.T.M. C-896-87. Typical shales are disclosed in U.S. Pat. Nos. 5,108,510, 4,992,321, 4,972,384, 4,859,318, 4,739,255, 4,668,380, 4,584,088, 4,514,378, 4,509,589, 4,494,928, and the like. The disclosure of each of these United States patents is hereby incorporated by reference into this specification.

In one embodiment, a preferred ceramic raw material for making the body of the ceramic cookware is a clay/shale mineral composition found in the State of New York and known as Alfred shale. Alfred shale generally contains at least about 30 percent of illite, from about 5 to about 30 percent of muscovite, and from about 40 to about 65 percent of other ingredients which typically include, e.g., organic material, quartz, chlorite, feldspar, bioitite, rutile, and the like.

In one preferred embodiment, the Alfred Shale contains at least about 60 weight percent of silica (such as, e.g., 61.2 weight percent of silica), at least about 18 percent of alumina (such as, e.g., 19.6 weight percent of alumina), at least 6 weight percent of ferrous oxide (such as, e.g., 7.4 weight percent of ferrous oxide).

The Alfred shale may also contain trace amounts of other oxides such as, e.g., 1.3 weight percent of magnesium oxide, 0.4 weight percent of calcium oxide, 1.0 weight percent of titanium, 1.4 weight percent of sodium oxide, 3.7 weight percent of potassium oxide, etc.

When the Alfred Shale is subjected to a loss-on-ignition (LOI) test, it generally loses at least about 2.0 weight percent of its weight and, preferably, at least 4.0 weight percent of its weight. As is known to those skilled in the art, the loss on ignition is the loss in weight which results from heating a sample of material to a high temperature after preliminary drying at a temperature just above the boiling point of water; the loss in weight upon drying is identified as free moisture, and the loss in weight occurring above the boiling point of water is the loss on ignition, reported as a percentage of the weight of the original dry sample.

The Alfred Shale for use in practice of the invention is preferably available in pulverized form; if not so available, it may be crushed in crusher 10. In general, it is preferred to crush the shale so that substantially all of its particles are smaller than about 0.15 inches.

Referring again to FIG. 3, the crushed particles from crusher 10 are then passed to vibrating screen device 14 via line 16 in which it is preferred to screen the crushed particles to preferably provide a dry clay/mineral composition having an average particle size distribution such that, generally, at least about 80 weight percent of the particles are smaller than 1.68 millimeters, at least about 70 weight percent of the particles are smaller than 1.19 millimeters, at least about 65 weight percent of the particles are smaller than 841 microns, at least 4 weight percent of the particles are larger than 595 microns, at least 6 weight percent of the particles are larger than 420 microns, at least 8 weight percent of the particles are larger than 297 microns, and at least 9 weight percent of the particles are larger than 37 microns. The particle size distribution of one typical Alfred shale is disclosed in TABLE 2 of U.S. Pat. No. 4,162,334.

By way of illustration, and not limitation, in one particular embodiment 172.4 grams of crushed Alfred shale were subjected to Tyler Screen analysis. 0.2 grams were retained on the #12 screen, 0.6 grams were retained on the #16 screen, 3.8 grams were retained on the #20 screen, 8.6 grams were retained on the #30 screen, 14.8 grams were retained on the #40 screen, 17.4 grams were retained on the #50 screen, 15.6 grams were retained on the #70 screen, 12.4 grams were retained on the #100 screen, 12.5 grams were retained on the #140 screen, 23.4 grams were retained on the #200 screen, 19.1 grams were retained on the #270 screen, 18.5 grams were retained on the #400 screen, and 18.5 grams passed through the #400 screen.

The screened particles are then passed via line 18 to mixer 20 wherein the particles may be mixed with water and, optionally, other ingredients.

An mixer known to those in the ceramic arts may be used as mixer 20. Thus, by way of illustration and not limitation, one may use a pug mill.

Referring again to FIG. 3, and in the preferred embodiment illustrated therein, the sized clay/mineral composition is mixed with other usual ingredients advantageous for forming a green clay ceramic cookware body with plasticity similar to that of other ceramic bodies.

A typical composition for forming the green brickware body 3 is comprised of from about 75 to about 85 weight percent of Alfred shale, and from about 18–20 weight percent of water.

Referring to FIG. 3, from about 15 to about 25 weight percent of water (by total weight of material in mixer 20) is preferably charged via line 22. In one embodiment, from about 18 to about 20 weight percent of water is charged via line 22.

In one preferred embodiment, barium carbonate is added via line 24. The barium carbonate so added may be in solid form or liquid form. In one embodiment, barium carbonate powder is added. In general, from about 0.05 to about to about 0.4 weight percent, by total weight of material in mixer 20, may be added. It is even more preferred to add from about 0.1 to about 0.3 weight percent of barium carbonate.

In one preferred, the barium carbonate is added via line 24 in the form of an aqueous solution to facilitate its dispersion throughout the clay batch.

The mixture formed in mixer 20 is generally a plastic material. It then is passed via line 26 to deairing extruder 28, wherein it is compressed into a pug form and simultaneously deaired.

The deaired pug is then passed via line 30 to ram press 32, wherein the pug is then formed into the desired green body shape. As is known to those skilled in the art, other forming methods also may be used such as, e.g., slip casting, jiggering,, jollying, and the like. These and other forming methods are well known and are described, e.g., in J. T. Jones et al.s "Ceramics: Industrial Processing and Testing" (The Iowa State University Press, Ames, Iowa, 1972).

By way of illustration, the green body may be in the shape of a cooking vessel such as a baking pan. For example, a bread pan such as that shown in FIG. 1 desirably often has dimensions of 4" wide×8" long×2½" deep. The size is not critical. A wall thickness of about 3/16" to ¼" is preferably used.

Referring again to FIG. 3, and in one preferred optional step, the green body from press 32 is passed via line 33 to trimmer 35 in which rough seam lines may be removed.

As is known to those skilled in the art, the baking pans produced via this invention are preferably formed in a mold. They can be slip cast or ram pressed. In either process, a rough seam line, is often formed by the mold and should preferably be removed for cosmetic and safety reasons; this act is often referred to as "fettling". Several metal, wooden, or rubber tools are often used, and chamois or soft natural sponge also may be used.

In the process of this invention, a mixture of water and vinegar is preferably used to smooth irregularities. As is known to those skilled in the art, vinegar is an aqueous liquid which generally contains from about 4 to about 8 percent of acetic acid.

It is preferred to use a vinegar/water mixture (or an acetic acid/water mixture) in which the vinegar is present in a concentration of less than 10 weight percent and, more preferably, less than 2 weight percent.

The vinegar/water mixture apparently has the ability to mend or age clay. Although applicants do not wish to be bound by any particular theory, they believe that this mixture reforms the particle alignment quickly and effectively and thus can be used to mend forming cracks in greenware by applying it with a smoothing tool or manually.

Referring again to FIG. 3, the green body from press 32, and/or the trimmed green body from trimmer 35, is passed to dryer 36, wherein it is preferably dried to a moisture content of less than about 15 weight percent.

The dried green body is then passed to spray booth 38 via line 40. In this spray booth 40, the terra sigillata is sprayed onto it.

Terra sigillata is a fine clay-like surface placed upon a ceramic body which can be heated (fired) to produce a satin-like surface on a finished product. For further information regarding the nature of terra sigillata materials and preparation, one should consult "The Surface Finish of Samian Ware" by J. D. Bestwick and T. S. Smith, *Science and Archaeology* no. 12 (1974), pages 21–31.

In general, terra sigillata coating composition is a dilute suspension of deflocculated particles of finely-divided clay particles obtained by dispersing a selected clay in water in the presence of a dispersing agent. Preferably, the clay used is the same clay as that used in the body of the vessel to be coated.

It is preferred that the terra sigillata preferably be prepared from Alfred Shale. The dispersing agent can be any of the defloculating agents used in the art. Preferably, the dispersing agent is a sodium phosphate such as Calgon (trade name for sodium phosphate containing approximately 67% $P_2O_5$).

In another preferred embodiment,, the terra sigillata contains a minor amount, less than about 1 weight percent, but at least about 0.05 weight, of sodium pyrophosphate 10 hydrate ($NaP_2O_7 \cdot 10H_2O$). Although not wishing to be bound to any particular theory, this dispersing agent deflocculates the clay during processing and produces a more uniform product.

In one embodiment, the Terra sigillata coating composition used to make the terra sigillata coating 4 of the present invention preferably is comprised of from about 20 to about 40 weight percent of Alfred shale (ground), from about 60 to about 80 weight percent of water, and from about 0.01 to about 1.0 weight percent of dispersing agent.

The aforementioned shale/water/dispersant mixture may be ball milled until substantially all of its particles are smaller than about 10 microns and, more preferably, are all smaller than about 1 microns. Thus, e.g., the Alfred shale mixture may be ball milled for 24 hours, put in a tank and allowed to settle for 24 hours; thereafter, the light colored top suspension may be decanted.

In one preferred embodiment, the terra sigillata coating composition is comprised of from about 20 to about 30 weight percent of Alfred shale (ground) and from about 70 to about 80 weight percent of water. In one aspect of this embodiment, the coating composition comprises 25 weight percent of the Alfred shale, 0.5 weight percent of dispersant, and 74.5 weight percent of water.

Referring again to FIG. 3, and in the preferred embodiment illustrated therein, it is critical that the moisture content of the dried green body be maintained within a specified range during the spraying operation. It is preferred that the dried green body contain from about 3 to about 15 weight percent of water, by total weight of the dried green body. It is more preferred that the dried green body contain from about 5 to about 11 weight percent of water. Applicants' have discovered that the use of this technique produces a substantially smoother fired surface in the finished product.

Referring again to FIG. 3, the terra sigillata coating composition is applied to the dried brickware body by conventional means, such as a spray gun. It is preferred to conduct this operation while the body is at room temperature. Thereafter, the body plus the terra sigillata coating 4 is preferably fired at one time, but multiple firings can be used. There is some memory or (a relic) of the small flat clay-like particles remaining after firing.

Referring again to FIG. 3, the coated body from spray booth 38 is then passed via line 42 to dryer 44. It is preferred to dry the coated body until it contains less than about 5 weight percent of water.

The dried body from dryer 44 is then passed via line 46 to furnace 48. It is preferred to fire the coated green body at a temperature of from about 1,875 to about 1,940 degrees Fahrenheit from a sintered body is obtained.

In one embodiment, the green body is placed into furnace 48 and the temperature of the furnace raised at a rate of from about 100 to about 200 degrees per hour until it reaches the desired temperature of from about 1,750 to about 1,940 degrees Fahrenheit. Thereafter, one may maintain the body at this temperature for from about 0 to about 60 minutes. It is preferred, however, to maintain the body at this temperature for less than about 30 minutes. Thereafter, the body is allowed to cool to ambient over a period of from about 6 to about 12 hours.

It is to be understood that the foregoing description of the preferred embodiments of this invention are illustrative only and that changes can be made in the compositions and proportions hereof without departing from the scope of the invention as defined in the following claims. For example, the terra sigillata coating can, if more convenient, cover the entire bread pan or other vessel rather than just the cooking surfaces. Also, while it preferably is a single sprayed-on layer, it could be a plurality of layers as long as the desired porosity was retained.

What is claimed is:

1. A process for preparing a terra sigillata coated body, comprising the steps of:
   (a) providing a green body comprised of a first clay, from about 3 to about 15 weight percent of water, and from 0.05 to about 0.4 weight percent of barium carbonate,
   (b) providing a coating composition comprised of from about 20 to about 40 weight percent of a second clay, and from about 0.01 to about 1.0 weight percent of dispersing agent,
   (c) coating said green body with said coating composition to provide a coated green body, and
   (d) firing said coated green body, wherein a mixture of vinegar and water is contacted to at least a portion of said green body.

2. The process as recited in claim 1, wherein said coated green body is fired at a temperature of from about 950 to about 1,160 degrees centigrade.

3. The process as recited in claim 2, wherein said first clay consists essentially of Alfred shale.

4. The process as recited in claim 3, wherein said second clay consists essentially of Alfred shale.

5. The process as recited in claim 4, wherein said green body is coated with said coating composition until a coating with a thickness of from about 5 to 15 microns has been applied to said green body.

6. The process as recited in claim 4, wherein said green body is coated with said coating composition until a coating with a thickness of from about 8 to 10 microns has been applied to said green body.

7. The process as recited in claim 5, wherein said coated green body is fired at a temperature of from about 1,000 to about 1,125 degrees centigrade.

8. The process as recited in claim 7, wherein said green body is comprised of from about 75 to about 85 weight percent of Alfred shale.

9. The process as recited in claim 8, wherein said green body is comprised of from about 0.1 to about 0.3 weight percent of barium carbonate.

10. The process as recited in claim 9 wherein, during the time said green body is coated with said coating composition, it contains from about 5 to about 11 weight percent of water.

11. The process as recited in claim 10, wherein said coating composition is applied to said green body with a spray gun.

12. The process as recited in claim 11 wherein, during the time said green body is coated with said coating composition, it is at ambient temperature.

13. The process as recited in claim 12 wherein, prior to the time said coated green body is fired, it is dried until it contains less than about 5 percent of water.

\* \* \* \* \*